US006785347B1

(12) United States Patent
Liu (10) Patent No.: US 6,785,347 B1
(45) Date of Patent: Aug. 31, 2004

(54) NONLINEAR-LEAST SQUARES BASED METHOD AND APPARATUS FOR FSK SIGNAL DECODING

(75) Inventor: Zheng-She Liu, Glenview, IL (US)

(73) Assignee: 3com Corporation, Marlborough, MA (US)

(*) Notice: Subject to any disclaimer, the term of this patent is extended or adjusted under 35 U.S.C. 154(b) by 0 days.

(21) Appl. No.: 09/298,498

(22) Filed: Apr. 22, 1999

(51) Int. Cl.[7] .............................................. H04L 27/14
(52) U.S. Cl. ...................................... 375/334; 375/272
(58) Field of Search ................................. 375/334, 342, 375/272; 327/9, 31, 33, 48; 341/63

(56) References Cited

U.S. PATENT DOCUMENTS

| 5,065,409 A | * | 11/1991 | Hughes et al. ............... 375/337 |
| 5,671,256 A | * | 9/1997 | Clark et al. .................. 375/342 |
| 5,864,585 A | * | 1/1999 | Erisman ....................... 375/272 |
| 6,081,820 A | * | 6/2000 | Holowko ...................... 708/300 |

OTHER PUBLICATIONS

Copyright 1997, 1998 by Grundig, Hitachi, Matsushita, Philips, Sharp, Sony, Thomson and Toshiba; The HAVi Architecture, Version 0.8, Specification of the Home Audio/ Video Interoperability (HAVi) Architecture; May 11, 1998; pp. I–XIV and 1–195.

* cited by examiner

*Primary Examiner*—Young T. Tse
*Assistant Examiner*—David B. Lugo
(74) *Attorney, Agent, or Firm*—McDonnell Boehnen Hulbert & Berghoff LLP (57) ABSTRACT

Disclosed is a method and apparatus for receiving FSK signals using estimation theory. A received signal is filtered to obtain energy estimates for a first frequency corresponding to a binary "0" and a second frequency corresponding to a binary "1". The energy estimates are subtracted to obtain a difference value and an odd number of samples of a series of difference values is smooth filtered in order to produce a series of average values. A sliding window is applied to the series of average values that detects a clear majority of sample corresponding to either the binary "0" frequency or the binary "1" frequency in order to produce a binary output signal that corresponds to the received signal.

27 Claims, 6 Drawing Sheets

NONLINEAR-LEAST SQUARES BASED METHOD AND APPARATUS FOR FSK SIGNAL DECODING

FIELD OF INVENTION

The present invention relates to digital communications. More specifically, it relates to efficient reception of a Frequency Shift Key (FSK) signal.

BACKGROUND OF THE INVENTION

Frequency Shift Keying (FSK) is a data modulation scheme commonly used in digital communications. FSK has been recommended as a low speed modulation format for numerous standards for the Public Switched Telephone Network (PSTN) by both national and international standards organizations. Examples of standards that recommend FSK are Bell 103, Bell 202, ITU-T V.21, and ITU-T V.23.

FSK possesses several characteristics that make it useful for communication systems. It is a simple modulation method that is a commonly used approach to the exchange of additional low speed information in high speed communication systems. For instance, FSK is used when call waiting caller ID information is transmitted during a voice or data connection. FSK is also used to exchange ITU-T V.8bis messages during a voice connection. In these applications, the computational complexity and memory requirements for demodulating of the signal are very important. A signal encoding scheme that requires a large amount of computation and memory for demodulation and detection will not be suitable for many Caller ID and other types of devices that have limited computing resources.

Because it is a simple signal encoding scheme, FSK is also often used as a start-up scheme for connections that use complex higher density signal encoding schemes, such as Quadrature Amplitude Modulation (QAM) signaling, and is recommended in ITU-T V.32 and ITU-T V.34.

It is well understood in the art that FSK can be detected using either a non-coherent method employing a frequency detector or a coherent method that utilizes a pair of product detectors.

Figure 1:
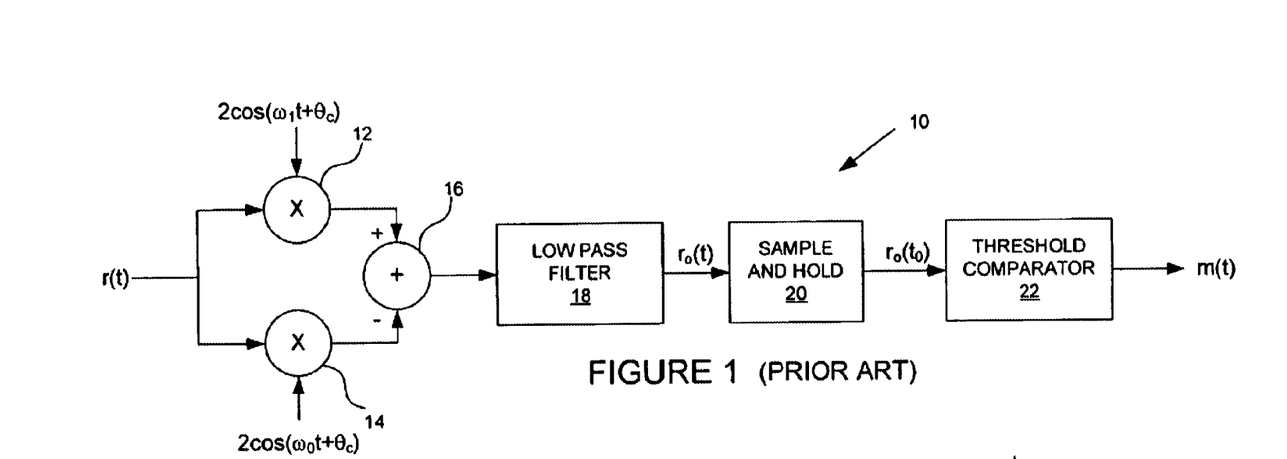
FIG. 1 is a block diagram illustrating a generalized coherent FSK receiver.

FIG. 1 illustrates a generalized coherent FSK receiver 10. The receiver 10 receives a received signal r(t) that is composed of a data signal s(t) and a noise signal n(t). The data signal s(t) is composed of mark (binary 1) and space (binary 0) signals $s_1(t)$ and $s_0(t)$, respectively. The mark signal $s_1(t)$ can be described as $s_1(t)=A \cos(\omega_1 t+\theta_c)$, where $\omega_1=2\pi f_1$ and $f_1$ is the frequency that represents a binary 1 in the FSK encoding scheme. The space signal $s_0(t)$ can be described as $s_0(t)=A \cos(\omega_0 t+\theta_c)$, where $\omega_0=2\pi f_0$ and $f_0$ is the frequency that represents a binary 0 in the FSK encoding scheme. In the FSK scheme described, $f_1 > f_0$ and the data frequency shift of s(t) is $\Delta F = f_1 - f_0$ around a center frequency $f_c$ of the FSK data signal s(t).

The receiver 10 includes an upper channel product detector 12 and a lower channel product detector 14, which each receive r(t). The upper channel product detector 12 receives a first coherent reference signal $2 \cos(\omega_1 t+\theta_c)$ at one input terminal and r(t) at a second input terminal. The lower channel product detector 14 receives a second coherent reference signal $2 \cos(\omega_0 t+\theta_c)$. Note here that, in coherent FSK detection, it is necessary to know the phase $\theta_c$ of the received sinusoidal signal in order to build the coherent reference signals $2 \cos(\omega_1 t+\theta_c)$ and $2 \cos(\omega_0 t+\theta_c)$.

The output of the lower channel product detector 14 is input to a negative terminal of summer 16 and the output of the upper channel product detector 12 is input to a positive terminal of summer 16. Summer 16 will subtract the lower channel output from the upper channel output in order to produce a difference signal at an output terminal of the summer. This difference signal is then input to a low pass filter (LPF) 18.

Figure 2:
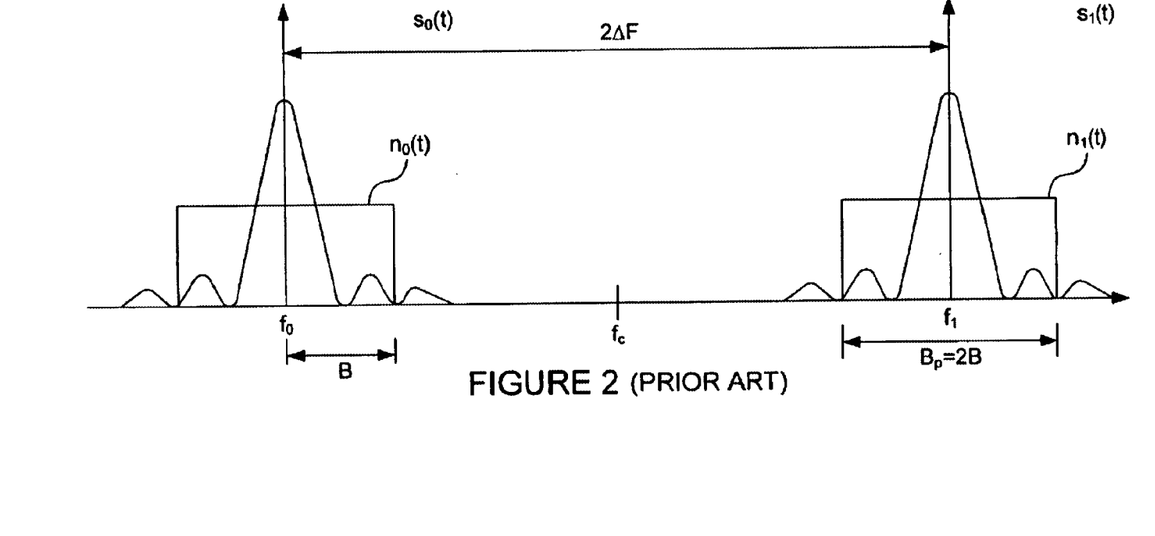
FIG. 2 is a power spectra diagram illustrating the signals present in the receiver of FIG. 1.

LPF 18, which can also be viewed as a matched filter, when combined with the frequency translation performed by product detectors 12 and 14, as dual bandpass filters. Thus, the input noise n(t) that affects the output of receiver 10 consists of two narrowband components $n_1(t)$ and $n_0(t)$ centered at $f_1$ and $f_0$, respectively. The bandwidth B of LPF 18 is less than the frequency difference $\Delta F$, such that $2\Delta F > 2B$, where the effective bandwidth $B_p$ is 2B, and the filtering action of LPF 18 separates the mark and space signals $s_1(t)$ and $s_0(t)$ in order to produce a baseband analog output signal $r_o(t)$. FIG. 2 illustrates the resulting power spectra for receiver 10.

The baseband analog output signal $r_o(t)$ is {+A for a binary 1; −A for a binary 0}+$n_o(t)$. This signal is input to sample and hold 20 that obtains a discrete signal $r_o(t_o)$ that is then input to threshold comparator 22 for comparison to threshold $V_T$. Because of the symmetry of the baseband analog output signal $r_o(t)$, i.e. a binary 1 is +A and a binary 0 is −A, and because the noise in each of the upper and lower channels is similar, i.e. white Gaussian noise, the optimum threshold for $V_T$ is 0. The threshold comparator 22 then outputs a digital output signal m(t) that reflects the data signal s(t) along with the noise signal n(t).

Theoretically, the performance of the coherent method is better than the non-coherent method. However, the coherent method requires that a coherent reference signal be obtained. The coherent reference is often extracted from the noisy received FSK signal so that the reference itself contains noise. Also, the reference recovery circuitry required to recover the coherent reference is typically complex and expensive. As a consequence, the non-coherent method is often used to avoid the coherent reference recovery circuitry.

Figure 3:
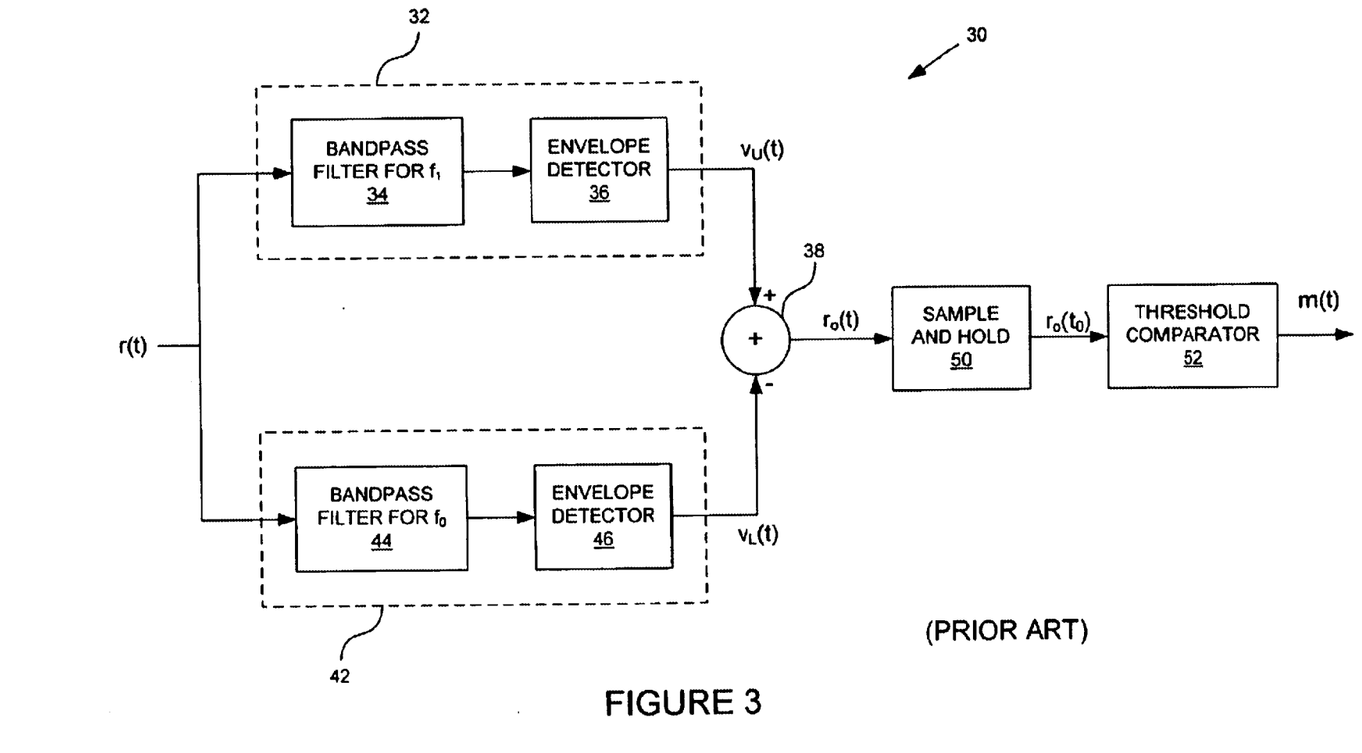
FIG. 3 is a block diagram illustrating a generalized noncoherent FSK receiver.

FIG. 3 illustrates a generalized noncoherent FSK receiver 30. Receiver 30 receives signal r(t) that is input to an upper channel detector 32 and a lower channel detector 42. The upper channel detector 32 is configured to detect the mark signal and is composed of a bandpass filter 34 centered on $f_1$ connected in series with an envelope detector 36. Envelope detector 36 outputs an upper channel output signal $v_U(t)$ that is input to a positive input terminal of summer 38. The summer 38 outputs analog output signal $r_o(t)$ to a sample and hold 50 that obtains a discrete signal $r_o(t_o)$ that is then input to threshold comparator 52 for comparison to a threshold voltage.

The lower channel detector 42 is configured to detect the space signal and is composed of a bandpass filter 44 centered on $f_0$ connected in series with an envelope detector 46. Envelope detector 46 outputs a lower channel output signal $v_L(t)$ that is input to a negative input terminal of summer 38.

The analog output signal $r_o(t)$ from summer 38 is positive when the upper channel output signal $v_U(t)$ exceeds the lower channel output signal $v_L(t)$. A mark signal can be viewed as the signal value of $v_U(t)$ for a mark less the signal value of $v_L(t)$ for a mark or $\{+A+n_1(t)\}-\{0+n_0(t)\}$. Similarly, $r_o(t)$ from summer 38 is negative when the lower channel output signal $v_L(t)$ exceeds the upper channel output signal $v_U(t)$. Thus, a space signal can be viewed as the signal value of $v_L(t)$ for a space less the signal value of $v_U(t)$ for a space or $\{-A+n_0(t)\}-\{n_1(t)\}$.

Noncoherent FSK detection requires only 1 dB of additional signal-to-noise ratio ($E_b/N_0$) over coherent FSK detection. However, in noncoherent FSK detection, it is unnecessary to generate a coherent reference signal and it is therefore unnecessary to know the phase $\theta_c$ of the received sinusoidal signal. An estimate of the phase information can be obtained using a phase locked loop (PLL) circuit. However, it is difficult to obtain a phase estimate in a digital receiver, particularly when the number of samples per binary bit is small because a phase estimate typically requires more than ten samples in order to converge. The Bell 202 and ITU-T V.23 standards, for example, set forth a requirement of only six samples per binary bit. Thus, noncoherent FSK receivers can be simpler to construct than coherent FSK receivers. However, in real systems, it is difficult to obtain relatively low bit error rates with noncoherent FSK detection.

Figure 4:
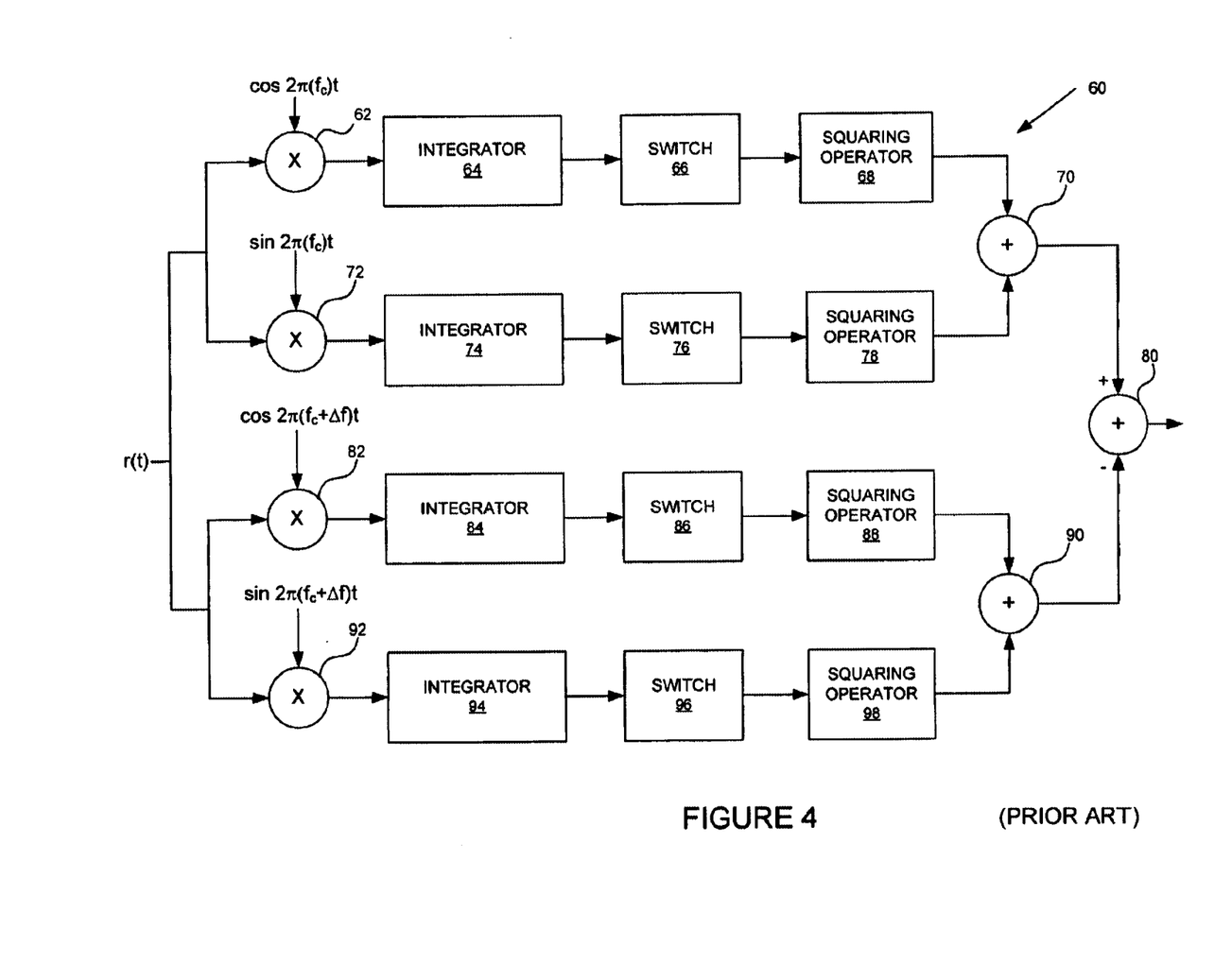
FIG. 4 is a block diagram of a generalized probabilistic noncoherent FSK receiver.

FIG. 4 illustrates another generalized embodiment of a FSK demodulation receiver 60 that operates on a probabilistic method of demodulation. The probabilistic receiver 60 receives received data signal r(t) which is input to four different channels. The first channel is composed of product detector 62, integrator 64, sampling switch 66 and squaring operator 68 connected in series, where product detector 62 multiplies the received signal r(t) by cos $2\pi f_c t$. An output of squaring operator 68 is connected to a first input to adder 70. Likewise, the second channel is composed of product detector 72, integrator 74, sampling switch 76 and squaring operator 78 connected in series, where product detector 72 multiplies the received signal r(t) by sin $2\pi f_c t$. An output of squaring operator 78 is connected to a second input to adder 70.

The third channel is composed of product detector 82, integrator 84, sampling switch 86 and squaring operator 88 connected in series, where product detector 82 multiplies the received signal r(t) by cos $2\pi(f_c + \Delta f)t$. An output of squaring operator 88 is connected to a first input to adder 90. Likewise, the fourth channel is composed of product detector 92, integrator 94, sampling switch 96 and squaring operator 98 connected in series, where product detector 92 multiplies the received signal r(t) by sin $2\pi(f_c + \Delta f)t$. An output of squaring operator 98 is connected to a second input to adder 90.

Each of the sample switches 66, 76, 86 and 96 receives a sampling signal $f_s$ that periodically closes the switches in order to obtain an instantaneous sample of the detected signal in each channel. The sample signal $f_s$ has a sample time T that must be recovered from the received signal r(t) using clock recovery circuitry.

The value of $\Delta f = 1/T$ of the sample time T such that the product detectors 82 and 92 for the third and fourth channels, respectively, detect a signal orthogonal to the signal detected by the product detectors 62 and 72, respectively, for the first and second channels. Note that the coefficients for product detectors 62, 72, 82 and 92 are all time varying and must therefore be constantly changed. The integrators 64, 74, 84 and 94 for each of the four channels of receiver 60 continuously integrate the detected signal of their respective product detectors from a beginning time instant for the signal detection of r(t) to a present time instant.

An output of adder 90 is subtracted from an output of adder 70 by subtractor 80 in order to obtain a decision value that is independent of the phase of the received signal. The receiver 60 selects the data signal, i.e. the mark frequency $f_1$ or the space frequency $f_0$, having the highest probability of having been sent by detecting the signal having the largest envelope value.

To obtain good performance from receiver 60, the sample rate $f_s$ must be devisable by both the mark frequency $f_1$ and the space frequency $f_0$. If this condition is not met, performance can degrade badly. However, the sample rate typically cannot be a multiple of both these frequencies. For example, ITU-T V.23 specifies a mark frequency of 1300 Hz and a space frequency of 2100 Hz while the sample rate is typically 7200 Hz, which is neither a multiple of 1300 Hz nor 2100 Hz.

Consequently, the need remains for a cost-effective FSK demodulation method that achieves low bit error rates.

SUMMARY OF THE INVENTION

In accordance with preferred embodiments of the present invention, some of the problems associated with conventional FSK receivers are overcome.

One aspect of the invention is a receiver for receiving a FSK signal having a first frequency corresponding to a binary "0" and a second frequency corresponding to a binary "1", where the receiver is composed of a first filter configured to pass a first phase of the first frequency to an output terminal of the first filter and a second filter configured to pass a second phase of the first frequency to an output terminal of the second filter. A first adder has a first input terminal coupled to the output terminal of the first filter and a second input terminal coupled to the output terminal of the second filter. A third filter is configured to pass a first phase of the second frequency to an output terminal of the third filter and a fourth filter is configured to pass a second phase of the second frequency to an output terminal of the fourth filter. A second adder has a first input terminal coupled to the output terminal of the third filter and a second input terminal coupled to the output terminal of the fourth. A subtractor has a positive input terminal coupled to an output terminal of the first adder and a negative terminal coupled to an output terminal of the second adder. The receiver also includes a smoothing filter having an input terminal coupled to the output terminal of the subtractor and a window decoder having an input terminal coupled to an output terminal of the smoothing filter and an output terminal for outputting a binary data signal corresponding to the received signal.

Another aspect of the present invention is a method for decoding a received signal having a first frequency representing a binary "0" and a second frequency representing a binary "1". The method according to the present invention includes determining a first energy level of the received signal corresponding to the first frequency and determining a second energy level of the received signal corresponding to the second frequency. The first and second energy levels are then compared in order to obtain a difference signal. The method then sets forth monitoring a predetermined number of samples of the difference signal in order to detect when a clear majority of the samples correspond to one of the first and second frequencies and generating a corresponding binary bit in a binary data signal responsive thereto.

The foregoing and other features and advantages of the present invention will be more readily apparent from the following detailed description, which proceeds with reference to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

The present invention is directed toward an improved FSK receiver. The FSK receiver according to the present invention operates by parameter estimation and employs two stages: a NLS (non-linear least squares) estimator that estimates the differences between the energy of the signals corresponding to a binary "0" and "1" from received samples; and a sliding windowing decoder that determines a binary "0" or "1" from the output of the estimator.

Figure 5:
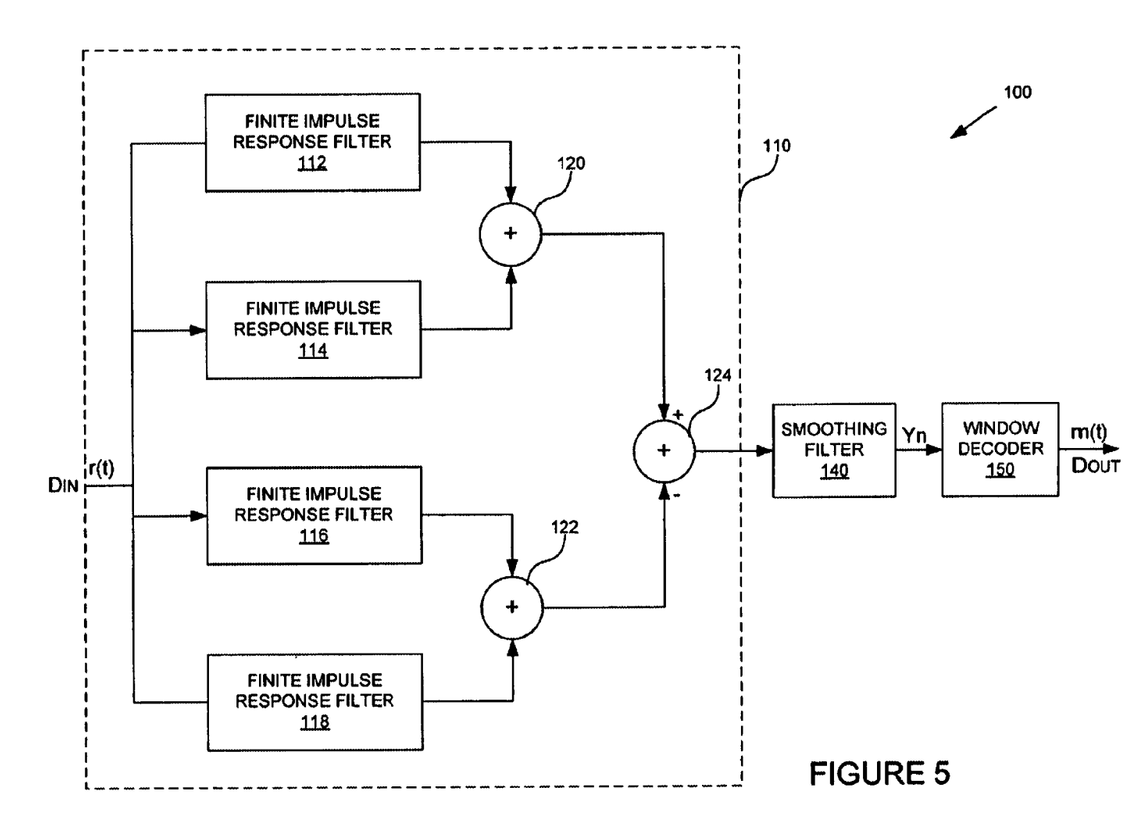
FIG. 5 is a block diagram of an embodiment of a receiver according to the present invention.

FIG. 5 illustrates an embodiment of a receiver 100 according to the present invention. A NLS estimator 110 receives a data signal r(t) at input terminal $D_{IN}$. The NLS estimator 110 has four Finite Impulse Response (FIR) filters 112, 114, 116 and 118. Each FIR filter has an input coupled to $D_{IN}$ and an output terminal. The output terminal of each of FIR filters 112 and 114 is coupled to a positive input terminal of adder 120. Likewise, the output terminal of each of FIR filters 116 and 118 is coupled to a positive input terminal of adder 122. The output of adder 120 is input to a positive input terminal of subtractor 124 and the output from adder 122 is input to a negative input terminal of subtractor 124 so that the sum of the output signals from FIR filters 116 and 118 is subtracted from the sum of the output signals from FIR filters 112 and 114.

Note that the output of adder 120 reflects the amount of energy in the received signal for a binary "0" while the output of adder 122 reflects the amount of energy in the received signal for a binary "1". See the discussion below regarding the FIR filter coefficients. Thus, the output of subtractor 124 represents a difference between the energy representing a binary "0" and a binary "1" in the received signal.

The difference values output by subtractor 124 of the NLS estimator 110 are input to smoothing filter 140. The smoothing filter 140 averages a predetermined number of sequential samples of the difference values, N/2+1 in the embodiment shown in FIG. 7, in order to produce an average value $Y_n$. The smoothing filter 140 helps filter out noise in the received signal when the number of samples of the received signal per binary bit is small.

The output signal $Y_n$ from NLS estimator 110 is input to windowing decoder 150 that monitors a sliding window of average values in order to determine a binary "0" or "1" from the output of NLS estimator 110 and generate a digital data signal m(t) at output terminal $D_{OUT}$ of receiver 100. Together, the smoothing filter 140 and window decoder 150 perform an error recovery and decoding function that compensates for noise in the received signal and inaccuracy of both the receiver sample rate and the transmitter timer.

Figure 6:
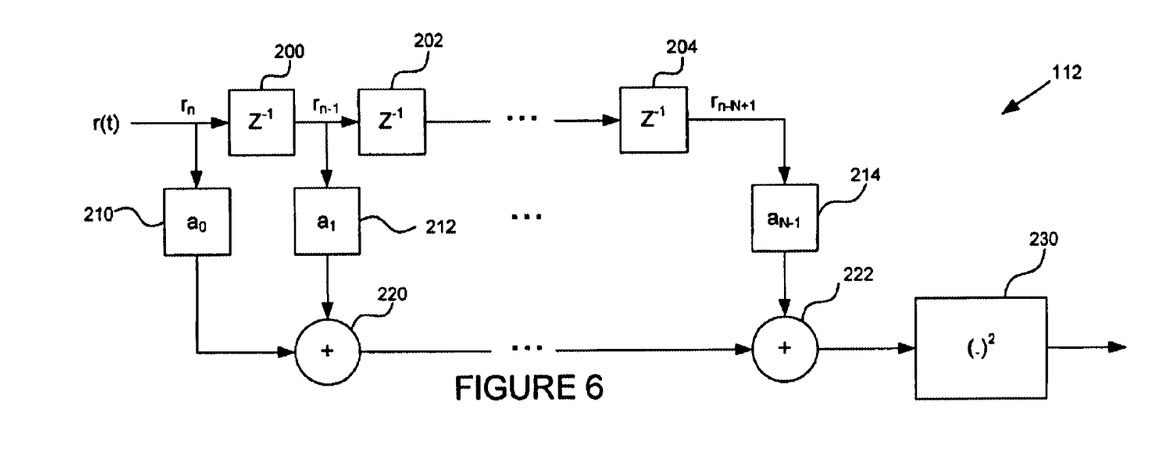
FIG. 6 is a block diagram of one of the FIR filters of FIG. 5.

FIG. 6 illustrates an embodiment of FIR filter 112 of FIG. 5, and, by extension, FIR filters 114, 116 and 118. Each of the FIR filters 112–118 includes a series of N−1 delay elements 200, 202 and 204 connected in series, where N is the number of data samples per binary bit processed by the FIR filter and the ellipses indicate a variable number of elements based on the value of N. The result of the series of delay elements is a set of N received data samples $\{r_n, r_{n-1}, \ldots, r_{n-N+1}\}$.

Each FIR filter also includes a series of N coefficient computation units 210, 212 and 214 that apply a predetermined weighted filter coefficient to a corresponding one of the received data samples. The weighted coefficients for FIR filters 112, 114, 116 and 118 are, respectively, $\{a_0, a_1, \ldots, a_{N-1}\}$, $\{b_0, b_1, \ldots, b_{N-1}\}$, $\{c_0, c_1, \ldots, c_{N-1}\}$, and $\{d_0, d_1, \ldots, d_{N-1}\}$. The values of the coefficients are given by the following equations:

$$a_l = \cos(2\pi f_0 l/f_s),$$
$$b_l = \sin(2\pi f_0 l/f_s),$$
$$c_l = \cos(2\pi f_1 l/f_s)$$
$$d_l = \sin(2\pi f_1 l/f_s),$$

where $f_s$ is the sample frequency, $f_1$ and $f_0$ are, respectively, the mark and space frequencies, and $l = 0, 1, \ldots, N-1$.

From the coefficient equations above, it can be seen that FIR filters 112 and 114 are configured to detect energy in the received signal that corresponds to $f_0$ and, thus, the energy corresponding to a binary "0". It can also be seen that FIR filters 116 and 118 are configured to detect energy in the received signal that corresponds to $f_1$ and, thus, the energy corresponding to a binary "1". The coefficients for each of the mark and space frequencies, a and b for $f_0$ along with c and d for $f_1$, are orthogonal to one another in order to obtain an effective estimate of the energy in the received signal regardless of the phase of the signal, i.e. phase independence is obtained by detecting both the sine and cosine aspects of the signal frequency.

In the FIR filter 112 shown in FIG. 5, the series of N−1 delay elements 200, 202 and 204 establish received data samples $r_n, r_{n-1}, \ldots, r_{n-N+1}$. These samples are then processed by a corresponding one of the N coefficient operators 210, 212 and 214. Thus, an input of coefficient operator 210, which performs filter coefficient $a_0$, is coupled to a first sample node of the series of delay elements for $r_n$ and processes data sample $r_n$. Likewise, an input of coefficient operator 212, which performs filter coefficient $a_1$, is coupled to a second sample node of the series of delay elements for $r_{n-1}$ and processes data sample $r_{n-1}$. This correspondence continues for each of the N samples processed by the FIR filter leading up to an input of coefficient operator 214, which performs filter coefficient $a_{N-1}$, being coupled to a last sample node of the series of delay elements for $r_{n-N+1}$ and processes data sample $r_{n-N+1}$. Thus, the coefficient operators 210, 212 and 214 apply the weighted filter coefficients to the series of samples in order to obtain a series of weighted samples.

The output signals from each of N coefficient operators 210, 212 and 214 are summed by a series of N−1 adders 220 and 222. The output signals are summed in sequence starting with $a_0$ operator 210 being summed with $a_1$ operator 212 by adder 220. The output of adder 220 is then added with the output of the next operator in the series of N coefficient operators 210, 212 and 214 until adder 222 adds the output of $a_{N+1}$ operator 214 with the sum of the output of all previous coefficient operators in the series of N coefficient operators 210, 212 and 214.

The output of the final adder 222 in the series of N−1 adders 220 and 222 is input to squaring operator 230 that squares the output value of final adder 222 for output from the FIR filter. By extension, the description above can be applied to FIR filters 214, 216 and 218 with regard to the b, c and d sets of coefficients. Also note that an alternative embodiment of the NLS estimator 110 of FIG. 4 can be implemented with a single series of delay elements where each $r_n$ sample tap of the delay series feeds the corresponding coefficient operator in each of the four FIR filters.

The filter coefficients above are weights that are applied to individual delayed samples of the received signal. The received signal consists of both data signal and noise signal. However, the energy of the data signal is time-varying while the energy of the noise is relatively constant. In order to emphasize the data signal with respect to the noise signal, greater weight is given to samples having higher data signal energy relative to samples having less signal energy.

Thus, the weighted samples generated by coefficient operators 210, 212 and 214 of FIR filter 112 are summed and squared in order to produce an estimate of the energy in the received signal corresponding to the cosine phase of the space frequency $f_0$. Likewise, FIR filter 114 generates an energy estimate for the sine phase of the space frequency $f_0$. FIR filters 116 and 118 obtain energy estimates for the cosine and sine phases, respectively, of the mark frequency $f_1$.

Figure 7:
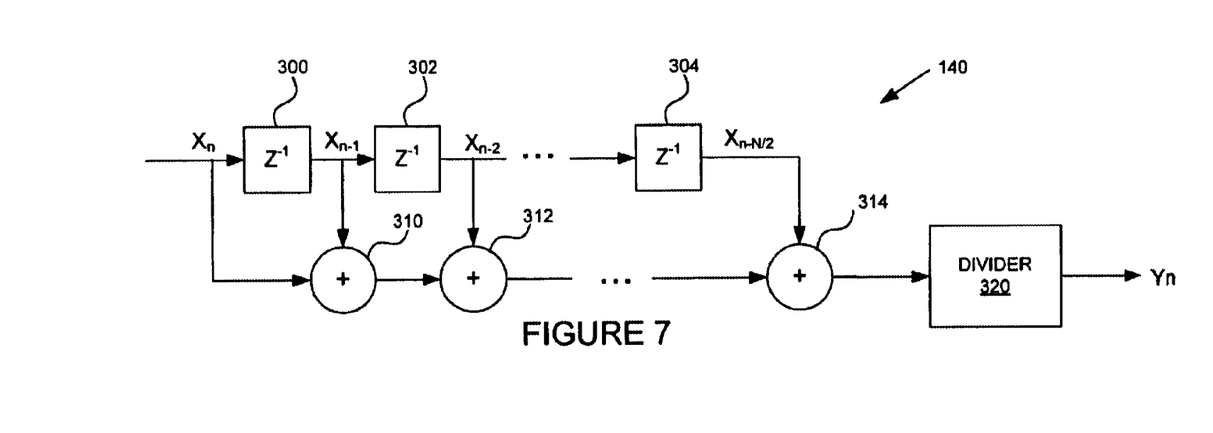
FIG. 7 is a block diagram of the smoothing filter of FIG. 5.

FIG. 7 shows an embodiment of a smoothing filter 140 according to the present invention. Smoothing filter 140 receives the difference values output by subtractor 124 and averages N/2+1 difference values for output as $Y_n$. Smoothing filter 140 includes a series of N/2 delay elements 300, 302 and 304 that results in a series of N/2+1 taps $\{X_n, X_{n-1}, X_{n-2}, \ldots X_{n-N/2}\}$. A series of N/2 adders 310, 312 and 314 of decoder 150 sums the values present at taps $\{X_n, X_{n-1}, X_{n-2}, \ldots X_{n-N/2}\}$ of the series of N/2 delay elements 300, 302 and 304 starting with adder 310 adding a first tap in sequence $X_n$ to a second tap in sequence $X_{n-1}$ and leading up to adder 314 summing the last tap in sequence $X_{n-N/2}$ to the sum of the previous taps. The output of adder 314 is then input to a division operator 320 that divides the sum generated by adder 314 by N/2+1 in order to produce an average value $Y_n$.

Smoothing filter 140 is particularly important in the presence of a strong noise component of the received signal. Without the smoothing filter, the bit error rate will rapidly increase in response to an increased noise component if the number of samples per binary bit is relatively small. The combination of the smoothing filter 140 and the window decoder 150 acts as an error recovery circuit that compensates for a strong noise signal as well as inaccuracy of the receiver sample rate and the transmitter clock.

Figure 8:
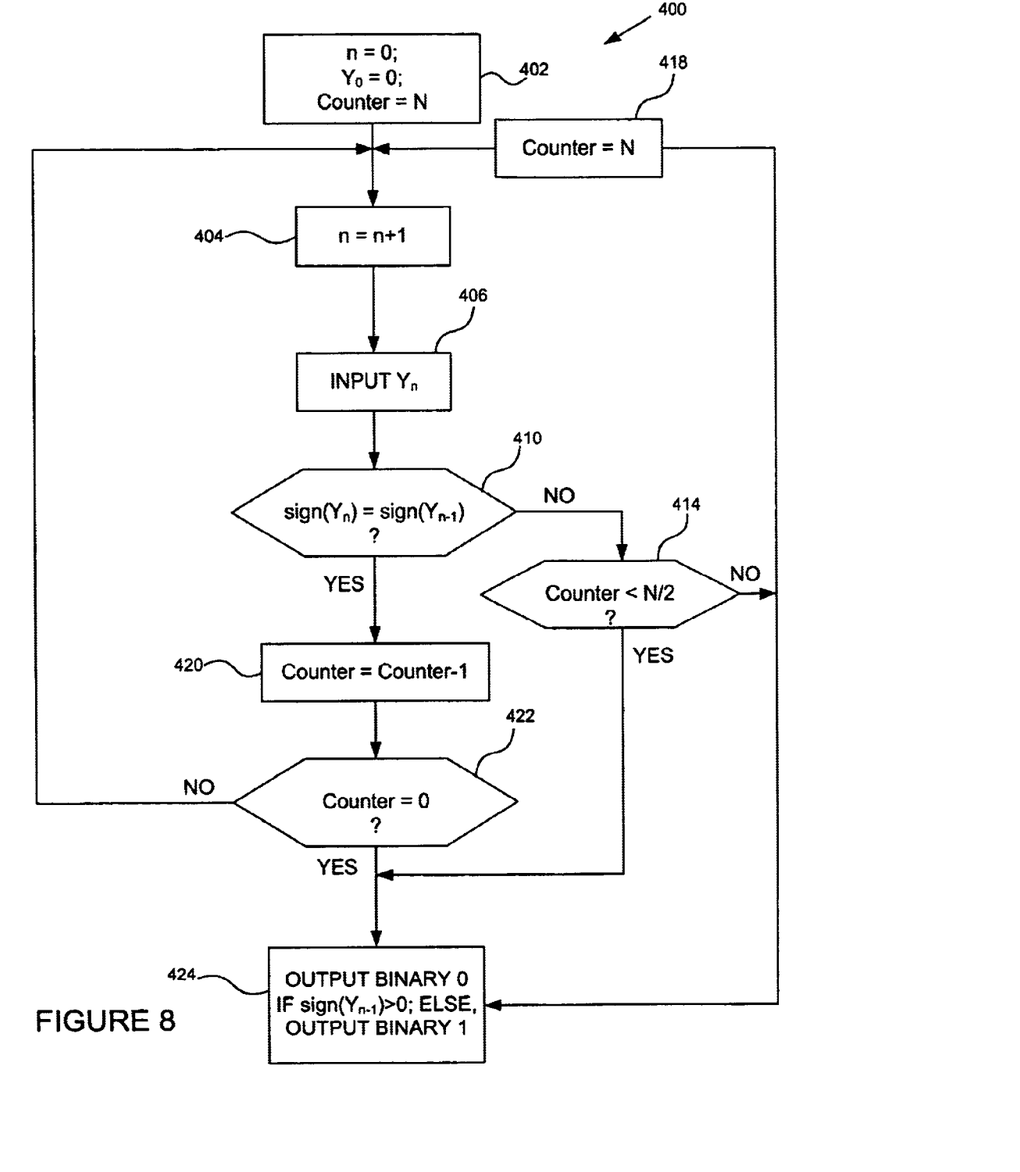
FIG. 8 is a flow diagram illustrating an embodiment of the function performed by the window decoder of FIG. 5.

FIG. 8 is a flow chart 400 of a sliding windowing decoder method for an embodiment of the windowing decoder 150 according to the present invention. The method shown in flow chart 400 determines a binary "0" or "1" from N estimated energy differences. In essence, the method of flow chart 400 examines a series of average values $Y_n$ looking at the sign of each average value. If a sequence of at least N/2+1 samples has the same sign value, then a binary "0" or binary "1" is output in the output data signal m(t).

At step 402 of flow chart 400, the indices n, $Y_0$ and Counter are initialized and control flow then moves to the main loop of the chart beginning at step 404. At step 404, the value of n is incremented so that the next sequential value of the output $Y_n$ from NLS estimator 110 is read in at step 406. The sign of $Y_n$ is then compared to the sign of the previous sequential value $Y_{n-1}$ at step 410. If the sign values of $Y_n$ and $Y_{n-1}$ are equal, then the value of Counter is decremented at step 420 and step 422 checks for Counter=0. If Counter has not yet reached 0, then control flow returns to step 404 to check the next sequential value of $Y_n$.

If Counter has reached 0 at step 422, then N consecutive values of $Y_n$ have been determined to have the same sign value. In other words, N samples of the output of NLS estimator 110 indicate the same binary value. Control flow then moves to step 424 where a binary "0" is output if the sign of the detected sequence of samples is greater than 0 and a binary "1" is output otherwise. Thus, window decoder 150 outputs a binary value of the output signal m(t) at output terminal $D_{OUT}$ of receiver 100. The value of Counter is then reset to N at step 418 and control flow returns to step 404.

If, at step 410, the sign values for $Y_n$ and $Y_{n-1}$ are different, then processing proceeds to step 414 where the value of Counter is compared to the value N/2. This step introduces a limited amount of noise immunity to the process and provides a way for the process to realign the N sample decoder window on a bit boundary. If the value of Counter is less than N/2, then a sequence of over N/2 samples of $Y_n$ has been detected having the same sign value. Control flow will then proceed to step 424 where a binary value will be output based upon the sign of the detected sequence.

If the Counter value is greater than or equal to N/2 at step 414, then an insufficient number of samples of $Y_n$ have the same value. In this case, control branches to step 418 where Counter is reset to the value N and continues on to step 404 where sequence detection resumes.

Thus, the flow chart 400 describes a windowing decoder that looks for a sequence of at least N/2+1 samples of $Y_n$ having the same sign value in order to output a binary "0" or "1" of the output signal m(t) at $D_{OUT}$.

Note that the number of samples in the window decoder 150 must be the same as the number of samples per binary bit performed by the receiver. The number of samples of the received signal processed by each of the FIR filters 112, 114, 116 and 118 can be different. However, reducing the number of samples in the filters below the sample per binary bit rate can result in insufficient use being made of the information available from the received signal. On the other hand, increasing the number of samples in the filters over the sample rate per binary bit can lead to a greater processing burden without improving the accuracy of signal reception by the receiver 100. Therefore, the number of samples N used throughout the description of the component parts of receiver 100 preferably conforms to the number of samples of binary bit.

To more completely comprehend the operation of the FSK receiver 100 of the present invention and the method of the present invention, let $a_r$, $f_r$, and $\phi$, denote the amplitude, frequency and phase, respectively, of the received sinusoidal signal r(t). Let $f_s$ denote the sampling frequency of the receiver. The received signal r(t) can then be described as $$r_{n-1} = a_r \cdot e^{j(2\pi f_r l/f_s + \phi)} + \zeta_{n-1}, \, l=0, 1, \ldots, N-1,$$

where $\zeta_{n-1}$ is the channel noise.

Among these parameters, $f_s$ is known and $a_r$, $\phi_r$, $f_s$ and $\zeta_{n-1}$ are all unknown. The problem that must be solved in order to receive the FSK signal is to determine if $f_r = f_1$ or $f_r = f_0$, i.e. whether the frequency of the received signal matches the frequency for a mark or space. Since $a_r$ and $\phi_r$ are not necessary for a solution, they can be combined together into a complex parameter $\alpha_r$ where $$\alpha_r = a_r e^{j\phi_r}.$$

The result is $$r_{n-1} = \alpha_r e^{j2\pi f_r l/f_s} + \zeta_{n-1}.$$

The NLS (nonlinear least squares) estimates of the unknown parameters are obtained by minimizing the following criterion:

$$C(\alpha_r, f_r) = \sum_{l=0}^{N-1} |r_{n-1} - \alpha_r e^{j2\pi f_r l/f_s}|^2.$$

For convenience of notation, let $$r = [r_n r_{n-1} \ldots r_{n-N+1}]^T,$$
$$\omega = [1 e^{j2\pi f_r l/f_s} \ldots e^{j2\pi f_r N-1/f_s}]^T,$$

where $[\bullet]^T$ denotes the transpose. The criterion can be rewritten in matrix form as follows:

$$C(\alpha_r, f_r) = \|r - \omega \alpha_r\|_2^2,$$

where $\|\bullet\|_2$ denotes the Euclidean norm. It can be shown that the NLS estimate $\hat{\alpha}_r$ of $\alpha_r$ is given by $$\hat{\alpha}_r = (\omega^H \omega)^{-1} \omega^H r.$$

For further information regarding Estimation Theory, see Z-S Liu, J. Li and P. Stoica, "RELAX-based Estimation of Damped Sinusoidal Signal Parameters", *Signal Processing*, 62 (1997) pp. 311–321, Elsevier Science B. V., herein incorporated by reference for all purposes.

The NLS estimate $\hat{f}_r$ of $f_r$ is then obtained by minimizing the following cost function:

$$C_1(f_r) = \|r - \omega(\omega^H \omega)^{-1} \omega^H r\|_2^2$$
$$= [r - \omega(\omega^H \omega)^{-1} \omega^H r]^H [r - \omega(\omega^H \omega)^{-1} \omega^H r]$$
$$= r^H r - r^H \omega(\omega^H \omega)^{-1} \omega^H r.$$

However, minimizing $C_1(f_r)$ is equivalent to maximizing the following cost function:

$$C_2(f_r) = r^H \omega(\omega^H \omega)^{-1} \omega^H r$$
$$= \frac{1}{N} \left| \sum_{l=0}^{N-1} r_{n-1} e^{-j2\pi f_r l/f_s} \right|^2$$
$$= \frac{1}{N} \left\{ \left[ \sum_{l=0}^{N-1} r_{n-1} \cos(2\pi f_r l/f_s) \right]^2 + \left[ \sum_{l=0}^{N-1} r_{n-1} \sin(2\pi f_r l/f_s) \right]^2 \right\},$$

or simply to maximize $$C_3(f_r) = \left[ \sum_{l=0}^{N-1} r_{n-1} \cos(2\pi f_r l/f_s) \right]^2 + \left[ \sum_{l=0}^{N-1} r_{n-1} \sin(2\pi f_r l/f_s) \right]^2.$$

The estimate $\hat{f}_r$ of $f_r$ obtained by maximizing $C_3(f_r)$ is still a very complicated NLS problem that is unlikely to obtain a close-form solution.

However, maximizing $C_3(f_r)$ does not have to be directly solved because it can be assumed, in the context of a received FSK signal, that either $f_r = f_1$ or $f_r = f_0$. If $f_r = f_1$, then $C_3(f_1)$ must achieve the maximal value. As a result, $C_3(f_1)$ must be larger than $C_3(f_0)$. Similarly, if $f_r = f_0$, then $C_3(f_0)$ must be larger than $C_3(f_1)$. Therefore, it can be determined that either $f_r = f_1$ or $f_r = f_0$ by comparing the values of $C_3(f_0)$ and $C_3(f_1)$.

The values of $C_3(f_0)$ and $C_3(f_1)$ are obtained in the receiver 100 of FIG. 4 by filtering the incoming data signal using FIR filters 112, 114, 116 and 118. The output signals from FIR filters 112 and 114 are summed by adder 120 to obtain the value of $C_3(f_0)$. The output signals from FIR filters 116 and 118 are summed by adder 122 to obtain the value of $C_3(f_1)$. Comparison of the values of $C_3(f_0)$ and $C_3(f_1)$ is performed by subtractor 124, which subtracts the value of $C_3(f_1)$ from the value of $C_3(f_0)$ to obtain a difference value sample that is input to smoothing filter 140. The smoothing filter averages an odd number of difference value samples in order to produce an average value sample $Y_n$.

The problem at this point is that there is no timing information for the received data samples. In other words, it is not known when the N samples for a binary bit begin in the received signal. To solve this problem, window decoder 150 uses a sliding window to examine N newly received samples. If a majority of the N samples corresponds to a binary "0", then the value of $C_3(f_0)$ must be larger than that of $C_3(f_1)$, or vice-versa. When half the number of samples correspond to a binary "0" and the other half to a binary "1", then $C_3(f_0)$ is randomly larger or smaller than $C_3(f_1)$. To avoid this situation, smoothing filter 140 averages an odd number of samples, N/2+1 samples in the embodiment of FIG. 6, to force a majority of samples to correspond to either a binary "0" or a binary "1" and eliminate the possibility of a tie in the number of samples for each binary bit value.

Note that the FSK receiving method according to the present invention is computationally simple and easy to implement in either hardware, software, or a combination of both. First, the coefficient values $\{a_1, b_1, c_1, d_1, l=0, 1, \ldots, N-1\}$ for FIR filters 112, 114, 116 and 118 can be calculated in advance and saved in a 4×N look-up table. A 1×N delay line can then be used to obtain N newly received samples $\{r_n, r_{n-1}, \ldots, r_{n-N+1}\}$ for the FIR filters.

In the smoothing filter 140, a 1×(N/2+1) delay line can be used to obtain $\{x_n, x_{n-1}, \ldots, x_{n-N+1}\}$, where $$x_n = \left( \sum_{l=0}^{N-1} a_1 \cdot r_{n-1} \right)^2 + \left( \sum_{l=0}^{N-1} b_1 \cdot r_{n-1} \right)^2 - \left( \sum_{l=0}^{N-1} c_1 \cdot r_{n-1} \right)^2 - \left( \sum_{l=0}^{N-1} d_1 \cdot r_{n-1} \right)^2.$$

Then, it is a relatively simple matter for window decoder 150 to determine the binary number sent to the receiver from $y_n$, the average of $\{x_n, x_{n-1}, \ldots, x_{n-N/2}\}$.

It can be shown that NLS estimates above are exactly the same as the Maximum Likelihood (ML) estimates when the channel noise present in the receiver is Gaussian noise. That is, for a Gaussian noise channel, the FSK receiver according to the present invention obtains optimal performance.

In the presence of non-Gaussian noise, the NLS estimates are no longer ML estimates, but still have excellent statistical properties. (See J. Li and P. Stoica, "Efficient mixed-spectrum estimation with applications to target feature extraction," IEEE Transactions on Signal Processing, 44(2) (1996), pages 281–295, herein incorporated for all purposes.) The estimates obtained using the present method thus asymptotically approach the Cramer-Rao bound and good receiver performance is obtained.

The FSK receiving method according to the present invention has excellent statistical properties and a computational complexity, approximately O(4.5N), that is low relative to many conventional FSK receivers. The receiver of the present invention can be quite robust relative to many conventional receivers especially when the number of samples per binary bit is small or in the presence of strong interference.

It should be understood that the programs, processes, methods, systems and apparatus described herein are not related or limited to any particular type of computer apparatus (hardware or software). Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or components may be used in the block diagrams. In addition, the present invention can be practiced with software, hardware, or a combination thereof.

The claims should not be read as limited to the described order or elements unless stated to that effect. Therefore, all embodiments that come within the scope and spirit of the following claims and equivalents thereto are claimed as the invention.

I claim:

1. A receiver for receiving a FSK signal having a first frequency corresponding to a binary "0" and a second frequency corresponding to a binary "1", the receiver comprising:

a first filter having an input terminal for receiving the FSK signal and an output terminal, where the first filter is configured to pass a first phase of the first frequency to the output terminal of the first filter;

a second filter having an input terminal for receiving the FSK signal and an output terminal, where the second filter is configured to pass a second phase of the first frequency to the output terminal of the second filter;

a first adder having a first input terminal coupled to the output terminal of the first filter, a second input terminal coupled to the output terminal of the second filter and an output terminal;

a third filter having an input terminal for receiving the FSK signal and an output terminal, where the third filter is configured to pass a first phase of the second frequency to the output terminal of the third filter;

a fourth filter having an input terminal for receiving the FSK signal and an output terminal, where the fourth filter is configured to pass a second phase of the second frequency to the output terminal of the fourth filter;

a second adder having a first input terminal coupled to the output terminal of the third filter, a second input terminal coupled to the output terminal of the fourth filter and an output terminal;

a subtractor having a positive input terminal coupled to the output terminal of the first adder, a negative terminal coupled to the output terminal of the second adder and an output terminal;

a smoothing filter having an input terminal coupled to the output terminal of the subtractor and an output terminal, wherein the smoothing filter averages a sequence of samples from the subtractor to produce an average value signal having a sign value; and a window decoder having an input terminal coupled to the output terminal of the smoothing filter and an output terminal for outputting a binary data signal, wherein the window decoder is configured to monitor a sequence of average value signals from the smoothing filter, and wherein the binary data signal matches the sign value of each of the average value signals.

2. The receiver of claim 1, where each of the first, second, third and fourth filters further comprises a FIR filter and a delay line for obtaining a first predetermined number of samples of the received signal, and further wherein:

the first filter has a first set of filter coefficients configured to detect a cosine phase of the first frequency;

the second filter has a second set of filter coefficients configured to detect a sine phase of the first frequency;

the third filter has a third set of filter coefficients configured to detect a cosine phase of the second frequency; and the fourth filter has a fourth set of filter coefficients configured to detect a sine phase of the second frequency.

3. The receiver of claim 2, where $f_0$ represents the first frequency, $f_1$ represents the second frequency, $f_s$ represents a sample frequency of each of the delay lines of the first, second, third and fourth filters, and N represents the first predetermined number of samples of each of the delay lines of the first, second, third and fourth filters, and further wherein:

the first set of filter coefficients is defined by $a_l = \cos(2\pi f_0 * l / f_s)$ for $l = \{1, 2, \ldots, N-1\}$;

the second set of filter coefficients is defined by $b_l = \sin(2\pi f_0 * l / f_s)$ for $l = \{1, 2, \ldots, N-1\}$;

the third set of filter coefficients is defined by $c_l = \cos(2\pi f_1 * l / f_s)$ for $l = \{1, 2, \ldots, N-1\}$; and the fourth set of filter coefficients is defined by $d_l = \sin(2\pi f_1 * l / f_s)$ for $l = \{1, 2, \ldots, N-1\}$.

4. The receiver of claim 3, where the smoothing filter comprises:

a delay line having an input terminal coupled to the output terminal of the subtractor, where the delay line of the smoothing filter is configured to obtain a predetermined odd number of samples of a difference value signal output from the subtractor for output on a series of the predetermined odd number of output terminals;

a series of adders coupled to the series of the predetermined odd number of output terminals of the delay line of the smoothing filter and configured to sum the predetermined odd number of samples obtained from the delay line of the smoothing filter in order to produce a sum value signal at an output terminal of the series of adders; and a divider having an input terminal coupled to the output terminal of the series of adders, the divider configured to divide the sum value signal from the series of adders by the predetermined odd number in order to generate the average value signal at the output terminal of the smoothing filter.

5. The receiver of claim 4, where the predetermined odd number is $N/2+1$.

6. The receiver of claim 5, where the window decoder is configured to monitor a sliding window of N samples of the average value signal output by the smoothing filter, and where the window decoder is further configured to generate a binary "0" in the binary data signal if each of the N samples of the average value signal corresponds to the first frequency and generate a binary "1" in the binary data signal if each of the N samples of the average value signal corresponds to the second frequency.

7. The receiver of claim 1, where the window decoder is configured to monitor a sliding window of N samples of the average value signal output by the smoothing filter, and where the window decoder is further configured to generate a binary "0" in the binary data signal if each of the N samples of the average value signal corresponds to the first frequency and generate a binary "1" in the binary data signal if each of the N samples of the average value signal corresponds to the second frequency.

8. The receiver of claim 1, where the smoothing filter is configured to average a predetermined odd number of samples of a difference value signal from the subtractor in order to generate the average value signal at the output terminal of the smoothing filter.

9. The receiver of claim 8, where the smoothing filter comprises:
a delay line having an input terminal coupled to the output terminal of the subtractor, where the delay line of the smoothing filter is configured to obtain the predetermined odd number of samples of the difference value signal output from the subtractor for output on a series of the predetermined odd number of output terminals;
a series of adders coupled to the series of the predetermined odd number of output terminals of the delay line of the smoothing filter and configured to sum the predetermined odd number of samples obtained from the delay line of the smoothing filter in order to produce a sum value signal at an output terminal of the series of adders; and
a divider having an input terminal coupled to the output terminal of the series of adders, the divider configured to divide the sum value signal from the series of adders by the predetermined odd number in order to generate the average value signal at the output terminal of the smoothing filter.

10. The receiver of claim 9, where the window decoder is configured to monitor a sliding window of N samples of the average value signal output by the smoothing filter, and where the window decoder is further configured to generate a binary "0" in the binary data signal if each of the N samples of the average value signal corresponds to the first frequency and generate a binary "1" in the binary data signal if each of the N samples of the average value signal corresponds to the second frequency.

11. The receiver of claim 9, where the predetermined odd number is N/2+1.

12. The receiver of claim 1, where the window decoder is configured to monitor a sliding window of N samples of the average value signal output by the smoothing filter, and where the window decoder is further configured to generate a binary "0" in the binary data signal if each of the N samples of the average value signal corresponds to the first frequency and generate a binary "1" in the binary data signal if each of the N samples of the average value signal corresponds to the second frequency.

13. The receiver of claim 12, where the smoothing filter is configured to average a predetermined odd number of samples of a difference value signal from the subtractor in order to generate the average value signal at the output terminal of the smoothing filter.

14. The receiver of claim 13, where the predetermined odd number is N/2+1.

15. A method for decoding a received signal having a first frequency representing a binary "0" and a second frequency representing a binary "1", the method comprising the steps:
determining a first energy level of the received signal corresponding to the first frequency;
determining a second energy level of the received signal corresponding to the second frequency;
comparing the first and second energy levels in order to obtain a difference signal;
averaging a predetermined number of samples of the difference signal to obtain an average signal; and
monitoring a predetermined number of samples of the average signal in order to detect a sequence in which each of the average signal samples correspond to one of the first and second frequencies and generating a corresponding binary bit in a binary data signal responsive thereto.

16. The method of claim 15, where:
the step of determining a first energy level of the received signal corresponding to the first frequency includes:
FIR filtering the received signal to obtain the energy level for a cosine phase of the first frequency,
FIR filtering the received signal to obtain the energy level for a sine phase of the first frequency, and
summing the energy levels for the cosine and sine phases of the first frequency to obtain the first energy level; and
the step of determining a second energy level of the received signal corresponding to the second frequency includes:
FIR filtering the received signal to obtain the energy level for a cosine phase of the second frequency,
FIR filtering the received signal to obtain the energy level for a sine phase of the second frequency, and
summing the energy levels for the cosine and sine phases of the second frequency to obtain the second energy level.

17. The method of claim 16, where $f_0$ represents the first frequency, $f_1$ represents the second frequency, $f_s$ represents a sample frequency of the received signal, N represents a first predetermined number of samples of the received signal and where:
the step of FIR filtering the received signal to obtain the energy level for a cosine phase of the first frequency includes FIR filtering with coefficients $a_l=\cos(2\pi f_0 * l/f_s)$ for $l=\{1, 2, \ldots, N-1\}$;
the step of FIR filtering the received signal to obtain the energy level for a sine phase of the first frequency includes FIR filtering with coefficients $b_l=\sin(2\pi f_0 * l/f_s)$ for $l=\{1, 2, \ldots, N-1\}$;
the step of FIR filtering the received signal to obtain the energy level for a cosine phase of the second frequency includes FIR filtering with coefficients $c_l=\cos(2\pi f_1 * l/f_s)$ for $l=\{1, 2, \ldots, N-1\}$; and
the step of FIR filtering the received signal to obtain the energy level for a sine phase of the second frequency includes FIR filtering with coefficients $d_l=\sin(2\pi f_1 * l/f_s)$ for $l=\{1, 2, \ldots, N-1\}$.

18. The method of claim 17, where the step of averaging a predetermined odd number of samples of the difference signal to obtain an average signal comprises averaging N/2+1 samples of the difference signal to obtain the average signal.

19. The method of claim 18, where the step of comparing the first and second energy levels in order to obtain a difference signal includes subtracting the second energy level from the first energy level in order to obtain the difference signal.

20. The method of claim 19, where the step of monitoring a predetermined number of samples of the average signal in order to detect when a sequence of the samples correspond to one of the first and second frequencies and generating a corresponding binary bit in a binary data signal responsive thereto comprises:

applying a sliding window of length N to samples of the average signal;

counting a number of samples of the average signal in sequence within the sliding window having a matching sign value to obtain a count value;

reinitializing the count value when a change in sign values occurs in the sequence within the sliding window;

generating a binary "0" in the binary data signal if the count value indicates that a sequence of at least N/2+1 has the matching sign value and the matching sign value is positive; and generating a binary "1" in the binary data signal if the count value indicates that a sequence of at least N/2+1 has the matching sign value and the matching sign value is negative.

21. The method of claim 20, where the step of monitoring a predetermined number of samples of the average signal in order to detect when a sequence of the samples correspond to one of the first and second frequencies and generating a corresponding binary bit in a binary data signal responsive thereto further includes:

reinitializing the count value when the count value indicates that N samples have been counted, and:

generating a binary "0" in the binary data signal if the matching sign value is positive, and generating a binary "1" in the binary data signal if the matching sign value is negative.

22. A computer readable medium having stored therein instructions for causing a central processing unit to execute the method of claim 21.

23. A computer readable medium having stored therein instructions for causing a central processing unit to execute the method of claim 15.

24. A receiver for decoding a received signal having a first frequency representing a binary "0" and a second frequency representing a binary "1", the receiver comprising:

first energy detecting means for detecting an energy level in the received signal corresponding to the first frequency;

second energy detecting means for detecting an energy level in the received signal corresponding to the second frequency;

subtracting means for producing a difference signal by subtracting the energy level corresponding to the second frequency from the energy level corresponding to the first frequency;

smoothing means for averaging a number of sequential difference value samples in order to generate an average value sample having a sign value; and window decoding means for monitoring a window of a number of sequential average value samples in order to generate a binary data signal matching the sign value of each of the average value samples.

25. The receiver of claim 24, wherein:

the first energy detecting means comprises:
first filtering means for passing a first phase of the first frequency,
second filtering means for passing a second phase of the first frequency, and
first adding means for generating the energy level in the received signal corresponding to the first frequency by adding the first phase of the first frequency passed by the first filtering means and the second phase of the first frequency passed by the second filtering means;

the second energy detecting means comprises:
to third filtering means for passing a first phase of the second frequency,
fourth filtering means for passing a second phase of the second frequency, and
second adding means for generating the energy level in the received signal corresponding to the second frequency by adding the first phase of the second frequency passed by the third filtering means and the second phase of the second frequency passed by the fourth filtering means.

26. The receiver of claim 24, where the window decoding means is configured to generate a binary "0" bit of the binary data signal if the matching sign value corresponds to the first frequency and generating a binary "1" bit of the binary data signal if the matching sign value corresponds to the second frequency.

27. The receiver of claim 24, where the smoothing means comprises:

delay means for obtaining a predetermined odd number of the sequential difference value samples;

summing means for summing the predetermined odd number of the sequential difference value samples; and dividing means for dividing the sum generated by the summing means by the predetermined odd number in order to generate the average sample value.

* * * * *